United States Patent [19]

Loomis

[11] 4,419,256

[45] Dec. 6, 1983

[54] BUILDING INSULATION COMPOSITION

[75] Inventor: Richard E. Loomis, Texarkana, Ark.

[73] Assignee: Delron Research and Development Corporation, South Bend, Ind.

[21] Appl. No.: 320,313

[22] Filed: Nov. 12, 1981

[51] Int. Cl.³ .......................... C04B 43/16; E04B 1/78
[52] U.S. Cl. ........................................ 252/62; 106/74; 106/75; 106/81; 106/18.12; 106/18.13; 162/159; 162/181.1; 162/181.2; 162/181.3
[58] Field of Search ....................... 252/62; 106/74, 75, 106/81, 18.12, 18.13; 162/159, 181.1, 181.2, 181.3

[56] References Cited

U.S. PATENT DOCUMENTS

| | | | |
|---|---|---|---|
| 1,944,008 | 1/1934 | Hobart | 106/75 |
| 2,470,641 | 5/1949 | Portz | 252/62 |
| 3,983,040 | 9/1976 | Draganov | 252/607 |
| 4,172,804 | 10/1979 | Christianson et al. | 252/62 |
| 4,203,773 | 5/1980 | Temple et al. | 501/85 |
| 4,230,585 | 10/1980 | Bird et al. | 252/607 |
| 4,373,005 | 2/1983 | Goodwin | 428/357 |

*Primary Examiner*—John E. Kittle
*Assistant Examiner*—Robert A. Wax
*Attorney, Agent, or Firm*—M. A. Hobbs; R. W. Campbell

[57] ABSTRACT

A composition for insulation which may be used for reducing thermal transmission, for absorbing sound waves and for providing a fire spread barrier, and which may be sprayed on surfaces in relatively thick coats. The composition includes a blended mixture of cellulose fiber, mineral wool, boric acid and expanded silicate glass. The blended fibers are mixed with an adhesive and sprayed on a surface to be insulated, and the adhesive preferably is a fire retardant, nontoxic adhesive which remains flexible after it has dried so that expansion or contraction of the insulation or the insulated surface will not result in cracks in the insulation.

14 Claims, No Drawings

BUILDING INSULATION COMPOSITION

BACKGROUND OF THE INVENTION

Many different types of building insulation are used for different types of construction. For example, in frame buildings fiberglass batts are often used in the side wall cavities and are fixed by nails or staples to the wall studs. In the ceilings, between the ceiling joints, fiberglass batts or loose fill insulation of different types are often used. Styrofoam board is another common type of building insulation which can be fitted between studs and joists or can be attached to a surface by adhesive. When completed buildings are insulated, blow-in type insulations are often used, which may be foam or loose fill fiber insulation.

While these and other types of insulation have performed satisfactorily for insulating frame buildings, newer types and methods of construction such as, for example, the open construction used with metallic buildings, do not permit the use of many of the previously known insulations. Metallic buildings, particularly those used for warehouses and/or other storage facilities, often have no ceiling. Thus, there is no suitable surface for supporting batts of insulation or the loose fill insulations. For insulating buildings with open construction, it is desirable to apply the insulation directly to the wall, roof or other surface being insulated, and to use adhesives to bond the insulation to the surface. Styrofoam boards can be used for this purpose; however, it is often difficult and time consuming to fit the boards around pipes, conduits, girders and the like. For an optimum thermal barrier the insulation should be fitted closely around any objects which intersect the surface being insulated, with no gaps through which heat transfer can occur between the insulation and the object. Spray-on insulations, which include an insulating component and an adhesive, have been used for insulating open structures, and have been applied as monolithic coatings on walls, ceilings and roofs. Cellulose fiber is often used in these types of insulation, and boric acid is added to the fiber to increase the fire resistance of the insulation. The boric acid is corrosive to metal and therefore disadvantageous when used in an insulation for metal buildings. To eliminate the corrosive effect of the boric acid, borax or other chemical agents are used to buffer the acid. Borax is expensive when compared with the other components of the insulation, and the addition of borax to boric acid containing insulators significantly increases the cost of the insulation, while contributing nothing to the heat or sound insulating qualities of the product.

Fire retardant, spray-on insulations which adhere directly to the surfaces on which they are applied have been used in the past; however, inexpensive products which can be applied easily and provide fireproofing of the area have not been available. Many of the previously used compositions of this type have been relatively heavy, thus adding substantial weight to the insulated surface. When first applied, the compositions are wet, and only thin layers, usually not more than about one inch thick, can be applied in a single application without causing areas of the applied product to sag, run or fall from the surface being insulated. Thus, to obtain a four inch thick coating of insulation, for example, four coats must be applied, allowing ample time for drying each coat before a subsequent coat is applied. This repetitive process for applying insulation adds to the cost and time required for insulating a structure since the application equipment must be set up for the separate applications, and the operator's time is increased for applying additional coats of the insulation.

Other problems have been associated with the use of spray-on type insulations which are applied directly to the surface being insulated. Many of the compositions used for such insulations fail to provide complete fireproofing, especially when only a relatively thin layer of the material is applied. It is desirable to limit the insulation coating to a thickness of approximately four inches, and to obtain therefrom a high resistance to thermal transmission. It is also desirable, in some circumstances, to achieve complete fireproofing, if possible, with a layer of only minimal thickness. Many of the compositions used previously do not provide fireproofing with a layer only four inches thick, and if thicker layers of insulation are used the insulation will often crack as a result of expansion and contraction of the surface to which it is applied. Thus, it is desirable to have a composition for insulation which will provide a fireproof barrier when used in layers of only minimal thickness, and which remains flexible when the layer is fully cured so that the insulation can bend and flex with expansion and contraction of the surface to which it is applied.

In addition to providing barriers to thermal transmission and fire spread, often it is also desirable to provide a sound absorbing barrier as well. While most insulation materials possess each of these characteristics to a greater or lesser degree, most insulation materials of the spray-on type do not possess all the characteristics to a high degree. For example, a composition highly resistant to heat transmission may not be highly resistant to flame spread. Thus, different compositions are often required, depending on the most desirable insulation characteristic.

SUMMARY OF THE INVENTION

It is therefore one of the principal objects of the present invention to provide a composition for a building insulation material which can be applied with an adhesive by spray methods to insulate ceilings and/or walls of buildings, and which will adhere to the surface to which it is applied readily and easily while remaining sufficiently flexible to prevent cracking or fracture due to expansion and contraction of the surface and the insulation as temperatures vary.

Another object of the present invention is to provide a composition for a building insulation which can be used for temperature insulating, sound absorbing and firewall purposes, and which has a low flame spread index and is highly resistant to thermal and sound transmission.

Still another object of the present invention is to provide a composition for building insulation which has low density so that the insulation applied to ceilings or walls will not add substantial weight to the building structure, and which is noncorrosive to metal so that the material may be applied directly to metal surfaces.

A further object of the present invention is to provide a composition for building insulation which can be produced economically to compete favorably with conventional building insulations, and which can be applied in relatively thick coats without sagging or running before it is dried fully, thereby minimizing installation costs.

These and other objects are achieved in the present invention by providing a building insulation composition which can be mixed with an adhesive during installation and sprayed onto ceilings, walls or other surfaces to be insulated. The insulation composition includes long fiber cellulose and rock wool together comprising about eighty-eight percent (88%) of the total weight of the composition. Normally the paper and wool will be about equally divided, each comprising about forty-four percent (44%) of the total mass of the product; however, the percentages of each may vary. Boric acid comprises about four percent (4%) of the total composition when the rock wool and cellulose fiber are equally divided; however, the boric acid should comprise about nine percent (9%) of the weight of the paper. Eight percent (8%) of the composition is expanded silicate glass. The components are combined and extensively blended during production of the insulation to form a fiber having visually nondistinguishable components.

The adhesive used with the insulation preferably is a fireproof adhesive which will remain flexible when dry to permit a monolithic coat of the insulation and adhesive to flex as temperature changes cause expansion and contraction. The insulation is inherently lightweight, can be applied in relatively thick coats, and the composition and adhesive after curing provide a fireproof barrier on the surface which is also resistant to sound transmission.

Additional objects and advantages of the present invention will become apparent from the detailed description.

DETAILED DESCRIPTION OF THE PREFERRED EMBODIMENT

The present invention is an insulation composition which combines advantages found individually in different products but not previously found together in a single product. For example, the present composition can be used as a wet spray insulation for fireproof requirements as well as for sound absorption. The insulation functions well for providing a barrier to heat transfer between areas, and the composition is lightweight, making handling and installing less burdensome and less expensive than for other spray-on insulations.

The insulation composition includes four principal ingredients, cellulose fiber, mineral or rock wool, expanded glass and boric acid. The ingredients of the insulation composition and processed and mixed together during manufacture to form a blended fiber which is mixed with an adhesive as the insulation is applied to a surface. Preferably the adhesive is a silicate base, fire-proof adhesive which remains flexible when dry, allowing the applied coat of insulation to contract and expand.

The cellulose fiber component of the insulating material preferably is a long fiber sulfate paper, which may include certain types of recycled papers such as milk cartons, corrugated paper and the like or the fiber can be obtained from wood or wood scraps. Although short fiber cellulose, such as that found in conventional newspaper stock, may be used, long fiber cellulose is preferred. The long fiber cellulose component of the composition normally is available relatively inexpensively, particularly if recycled paper fiber is used, thus minimizing the cost of the insulation composition. The long fiber cellulose comprises about forty-four percent (44%) of the total weight of the insulation material in the preferred composition, and rock wool or mineral wool comprises an additional forty-four percent (44%) of the total weight of the insulation material. A high temperature mineral wool, that is one having a melting temperature of at least about two-thousand two-hundred degrees Fahrenheit (2200° F.), is generally preferred, and mineral wools of this type from metal slag, such as copper slag, are known and commonly available. In the preferred composition the percent by weight of long fiber cellulose will be substantially equal to the percent by weight of mineral wool; however, the insulation composition can be comprised of differing weights of each. A variance of about twenty percent (20%) or more in the comparative weights of the long fiber cellulose and mineral wool can be used; however, the combined weight of the cellulose and mineral wool should be about eighty-eight percent (88%) of the total weight of the insulation composition. Hence, by way of example, if the amount of the paper component is increased to fifty percent (50%) of the total weight of the insulation composition, the amount of mineral wool should be reduced to about thirty-eight percent (38%) of the total weight of the composition. As mentioned previously, a variation of at least about twenty percent (20%) in the amounts of cellulose fiber and mineral wool can be used. Hence, the amounts of cellulose fiber and mineral wool in the composition may each vary from about thirty-five percent (35%) to about fifty-three percent (53%) of the total weight of the composition, and the combined weight of the cellulose fiber and mineral wool preferably is about eighty-eight percent (88%) of the total weight of the composition. A variation in the combined weight of cellulose and mineral wool, from about eighty-six percent (86%) to about ninety percent (90%), is tolerable in the preferred composition, and greater variations may also be used, though the product therefrom may not exhibit optimum characteristic qualities at the same cost of production as a product formed from components within the preferred ranges.

A fire retardant is used in the insulation composition to negate the inherent flammability of the cellulose fiber, and boric acid is the preferred fire retardant for use in the present invention. When the cellulose fiber comprises forty-four percent (44%) of the total weight of the composition, about four percent (4%) by weight of boric acid is required. If the amount of paper is either increased or decreased, the amount of boric acid may be varied, and the weight of the boric acid should be equal to about nine percent (9%) of the weight of the cellulose fiber. A variation of about two percent (2%) in the concentration of boric acid in the composition is tolerable in the preferred composition.

The boric acid is corrosive, and a buffer is required in the insulation composition to negate the corrosive effect of the boric acid, thus permitting application of the composition directly on metal surfaces. An amorphous expanded silicate glass, commonly available commercially under the trademark Dacatherm from the Diamond Shamrock Company, is used in the present composition, and the expanded glass buffers the boric acid, thereby reducing the corrosive effect of the boric acid, while at the same time enhancing the insulation value of the composition. The expanded silicate glass normally is less expensive than other types of previously used buffers, such as borax, and, unlike the previously used buffers, the expanded silicate glass improves the resistance of the insulation product to thermal transmission. Further, the expanded silicate glass is lightweight compared with borax, and as a result, the finished insulation product is lighter than spray-on insulations which use borax. This allows the present insulation to be applied in substantially thicker layers than the other insulations, thereby saving time and expense in installation. The expanded silicate glass will normally comprise about eight percent (8%) of the total weight of the composition, and the relative concentration of the glass should not be varied even as the relative concentrations of the other components are varied. Thus, regardless of the relative concentrations of cellulose fiber, mineral wool and boric acid, the preferred composition includes eight percent by weight expanded silicate glass. As with the other components, a variation of two percent (2%) in the concentration of the expanded silicate glass can be readily tolerated in the composition.

In preparing the insulation composition of the present invention, the long fiber cellulose is ground thoroughly to a mush-like consistency. This can be performed satisfactorily in a hammermill, and two hammermills may be used, the first being a coarse grind mill and the second being the finish mill. The boric acid fire retardant is added through an auger in the second hammermill which receives the ground cellulose from the first hammermill. The cellulose fiber and boric acid are removed from the second hammermill and transferred to an accumulator bin by a conduit containing a cyclone. The mineral wool is added through the conduit before the material passes through the fan blade of the cyclone. The mineral wool will often be compressed or tightly packed for shipping and handling purposes, and should be fluffed. The wool is not added in the hammermill to reduce pulverization of the wool fibers. By adding the mineral wool through the conduit between the hammermill and the cyclone, the wool is fluffed by the fan blade prior to its entry into the accumulator bin. The expanded glass is added through a vein feeder at the top of the bin, and all components are thoroughly mixed in the bin to create a blended fiber containing visually nondistinguishable individual components.

The insulation composition of the present invention can be applied to a ceiling, roof, wall or other surface by spraying the composition, together with a suitable adhesive, onto the surface. Conventional insulation sprayers can be used, in which a tank containing the adhesive and a bin containing the insulation are joined by hoses to a spray applicating nozzle. An adhesive for use with the present insulation composition should mix with the fibers in the composition so that a monolithic coating of insulation is formed when the adhesive dries, and the adhesive should remain flexible after it is dried so that a coating of the insulation, applied to a wall or roof, will not crack from changes in temperature causing expansion and contraction of the insulation or the surface on which it is applied. Since the insulation composition itself is nonflammable and can be used as a fireproof barrier, the adhesive used for applying the insulation to a surface should also be flame resistant and suitable for use in a fire retardant barrier. Thus, a silicone/silicate adhesive is preferred to installing the present insulation composition, and a suitable type thereof is marketed by the Dyna-Sol Company under the tradename Space Seal No. 5. This particular fireproof adhesive includes about ninety and seven-tenths percent (90.7%) sodium silicate, four and forty-two one-hundredths percent (4.42%) silicone resin solution, two and eighty-nine one-hundredths percent (2.89%) water, one and ninety-five one-hundredths percent (1.95%) 1, 2 Ethanediol and four one-hundredths percent (0.04%) of other additives. This particular adhesive will bond suitably with the insulation composition to form a monolithic coat of the material, and the coat remains flexible when dry so that the coat of insulation will not fracture. Other inorganic fireproof adhesives may be suitable, and when fireproofing is not required, non-fire resistant adhesives may also be used.

The adhesive and light weight insulation composition permit relatively thick coats of insulation to be applied in a single application. Thus, a four inch coat may be applied in a single application without a risk of the yet undried insulation sagging or falling. The cost of installing the present insulation is substantially less than the cost for installing previously used spray-on insulations in that, in most circumstances, only a single coat need be applied, whereas previously three or four coats were required. A four inch thick coat of the present insulation composition will be sufficient for most insulating purposes in that the R value of the present composition is approximately six per inch. Thus, a four inch coat of the insulation will have an R value factor of 24. Further, a coat of the insulation four inches thick will meet standard fireproofing requirements.

The present insulation composition has been extensively tested for determining its suitability for each of three primary uses, namely thermal insulation, fireproofing and sound absorption. The results of the tests were as follows:

TEST I—Thermal Resistance

The purpose of this test was to overcome the widely differing results which are obtained when different standard material tests were used. For example, with some types of insulation, the thermal resistance calculated from the standard materials test procedure outlined in ASTM C-518 will differ substantially from the thermal resistance calculated from the procedure outlined in ASTM C-177. Thus, a test was designed to compare the thermal resistance of the present composition against a known insulation product.

A test box measuring four feet square and sixteen inches high was constructed of two-inch by four-inch lumber. The four walls and the floor were lined with standard one-half inch gypsum wall board, and the exteriors of the walls were covered with one-eighth inch decorative wall panel. The interior cavities of the walls and floor were completely filled with spray-applied cellulose insulation to provide a thermal resistance of approximately R 11 for the walls and floor. An electrical resistance heating unit and an electric fan were placed inside the box, and a thermal couple was provided therein for monitoring the inside temperatures. The fan was operated as full voltage, and the heating unit was controlled by a variable power supply, which allowed the temperature to be set at any desired level. The ceiling comprised a four foot square box constructed of two-inch by four-inch lumber on sixteen inch centers, with a gypsum wall board inner sheeting. The ceiling box served as the sample holder and was sealed to the test box walls with a flexible foam gasket. The insulation to be tested was placed into the ceiling box to a depth of three and one-half inches. A fifteen inch by fifteen inch piece of polyisocyanurate foam insulation with foil on both faces was used for a calibrated heat flow meter, and a thermopile consisting of five thermocouples on each face served to register the temperature drop across the heat flow meter. The thermal resistance of the heat flow meter was determined to be 6.4 ft$^2$hr. degree of F/BTU when tested under the procedure outlined in ASTM C-518. By placing the heat flow meter on the insulation in the sample box and allowing temperature equilibrium to be achieved, the amount of heat flowing through the calibrated heat flow meter, and thus the amount of heat flowing through the insulation sample, can be determined.

To develop a standard against which the insulation of the present invention could be compared, the sample ceiling was filled with a single layer of R-11 fiberglass batt insulation 3.5 inches thick. The heat flow meter was placed on top of the batt and the interior temperature of the test box was set at 150° F. The entire testing assembly was housed in a room held at 70° F.±5° and 50%±5% relative humidity for forty-eight hours to establish equilibrium. After equilibrium was achieved the following temperatures were measured:

$T_{in}$ = temperature inside box = 149.9° F.

$T_{t/p}$ = temperature between insulation and heat flow meter (h.f.m.) = 99.5° F.

$T_{out}$ = temperature on top of heat flow meter = 71.6° F.

By comparing the temperature drop across the batt with the temperature drop across the heat flow meter, the thermal resistance of the fiberglass batt can be determined. Thus $$R_{batt} = \frac{\Delta T_{batt}}{T_{h.f.m.}} \times R_{h.f.m.}$$

$$= \frac{(149.9 \text{ F.°} - 99.5 \text{ F.°})}{(99.5 \text{ F.°} - 71.6 \text{ F.°})} \times 6.4 \text{ ft}^2 \text{ hr °F./BTU}$$

$$= 11.56 \text{ ft}^2 \text{ hr °F./BTU}$$

or an R value of approximately 3.3/in

A sample of the present insulation composition was similarly tested for comparison with the standard established by the fiberglass batt. The ceiling box was sprayed full of the present insulation, and the insulation was allowed to dry. The ceiling piece was placed on top of the test chamber, and the inside temperature of the chamber was adjusted to 150° F. The system was allowed to equilibrate for forty-eight hours, and the following temperatures were recorded:

$T_{in}$ = 145° F.

$T_{t/p}$ = 88.7° F.

$T_{out}$ = 71.6° F.

The thermal resistance of the present insulation was calculated as follows:

$$R = \frac{(145° \text{ F.} - 88.7° \text{ F.})}{(88.7° \text{ F.} - 71.6° \text{ F.})} \times 6.4 \text{ hr. ft}^2 \text{ °F./BTU}$$

$$= 21.1 \text{ hr. ft}^2 \text{ °F./BTU}$$

Thus the R value of the present insulation was determined to be about 6.0 per inch when tested under a procedure yielding an R value of 3.3 per inch for fiberglass batt.

TEST II—Surface Burning Characteristics

To determine and measure the properties of the present insulation composition in response to heat and flame conditions, a surface burning characteristics test was performed. The test was conducted in accordance with the provisions of the American Society for Testing and Materials Standard Method of Test E 84-80, "Surface Burning Characteristics of Building Materials," which is also known as the Steiner Tunnel Test. The method of this test is similar to the following standard test procedures; ANSI 2.5, NFPA No. 255, UBC No. 42-1 and UL No. 723. The purpose of the test is to compare the surface flame spread and smoke developed measurements of the tested material with standards established by asbestos-cement board and select grade red oak flooring. The material being tested is exposed to a flaming fire exposure which is sufficient to spread the flame along the entire length of a red oak specimen in five and one half minutes during a ten minute test. Measurements of the flame spread over the surface and the density of the resulting smoke are made and recorded. The test results are computed relative to the standards established by the red oak specimen which has a rating of one hundred for both flame spread and smoke development, and the asbestos-cement board which has a zero rating. The results are expressed as the Flame Spread Index and the Smoke Developed Index.

A specimen of the present composition was spray applied two inches thick on a one-quarter inch asbestos-cement board. The specimen was allowed to equilibrate in an atmosphere maintained at 70° F. and 50% relative humidity. The zero reference and other data were verified by conducting a ten minute test using one-quarter inch asbestos cement board just prior to testing the insulation material, and periodic tests using NOFMA certified select grade red oak flooring were conducted to verify the one hundred reference. The present insulation was tested within parameters outlined in the standard test method procedure. The test results computed on the basis of observed flame front advance and the integrated area under the recorded curve of the smoke density apparatus are presented in the following table:

| Test Specimen | Flame Spread Index | Smoke Developed Index |
|---|---|---|
| asbestos - cement board | 0 | 0 |
| red oak flooring | 100 | 100 |
| insulation sample | 0 | 10 |

No ignition was noted over the burners and the maximum temperature recorded during the test was 670° F.

TEST III—Steady-State Thermal Transmission

The present insulation was tested under a comparative method against standard specimens in accordance with the American Society for Testing and Materials Standard Method of Test C 177, "Steady-State Thermal Transmission Properties By Means of The Guarded Hot Plate". The method is capable of determining thermal properties within plus or minus three percent of ASTM C 177. The test specimen was held between a hot plate and a cold plate, the temperatures of which were measured using platinum resistance temperature sensors. The temperature of the hot plate was controlled using two independently regulated heating elements and a multijunction thermopile located therebetween to provide a relatively uniform and steady temperature across the surface of the plate. The cold plate was maintained at temperatures below ambient temperatures by means of a Freon cooling system and a controlled heater element. A heat flow meter constructed by CRIR Laboratories of St. Gobain Industries, France, was used to measure the heat flow through the sample. The meter covered a ten inch by ten inch area in the center of the sample. The apparent thermal resistance of the sample was calculated as follows:

$$R = (Th - Tc)/(c)(Q)$$

Where:
R = thermal resistance
Th = hot plate temperature
Tc = cold plate temperature
C = constant during calibration using SRM
Q = heat flow meter output, mV
and the apparent thermal conductivity can be computed as $$k = C \times Q \times D/(Th - Tc)$$

Where:
k = thermal conductivity
D = thickness of test specimen

A specimen of the present invention 1.970 inches thick was placed between a hot plate at 100.60° F. and a cold plate at 51.64° F. The mean temperature was 76.12° F., the thermal conductivity of the insulation sample was calculated to be 0.3217, and the thermal resistance of the insulation was calculated to be 6.1237.

TEST IV—Fire Resistance

A test was conducted in accordance with the procedure outlined in ASTM E 119-80 "Standard Methods of Fire Tests of Building Construction Materials" to determine the ability of the insulation of the present invention to prevent the passage of heat and/or flames during exposure to a test flame controlled to achieve prescribed temperatures corresponding to specific fire exposure conditions.

A test sample of the present insulation was prepared by constructing a corrugated steel wall of 16 gauge material in a test frame measuring 11 feet by 11 feet. A monolithic layer of the insulation approximately 2.25 inches thick was spray-applied in a single coat on the steel wall using the preferred adhesive recited hereinabove. The sample was placed in a test furnace having 33 adjustable gas ports and 33 adjustable air ports. A system of 17 symmetrically distributed thermocouples was provided six inches away from the exposed face of the sample, and the temperature adjustments of the furnace were based on the average temperature recorded by the thermocouples. The temperature of the unexposed surface of the sample assembly was measured with 18 gauge type K thermocouples centrally located under standard flexible dry-felted asbestos pads. The pads and thermocouples were held firmly against the surface, and the pads were closely fitted around the thermocouples. The thermocouples on the unexposed surface were located not less than twelve inches from any edge of the assembly, and the thermocouples were located at a minimum of nine points on the assembly to continuously record the surface temperature.

A test lasting sixty (60) minutes was conducted, and a total of two-thousand four-hundred ten (2,410) cubic feet of natural gas yielding 2.482 million BTU was used during the test. As the test progressed the exposed surface of the sample gradually darkened; however, no visible structural change occurred until approximately twenty-five (25) minutes into the test, at which time slight melting and fusing of the surface were observed. At about forty-three (43) minutes into the test the exposed surface was completely fused into a smooth glassine layer, and the surface glowed bright red. At approximately forty-eight (48) minutes and thirty (30) seconds into the test some sagging and dripping of the surface were observed, and the sagging and dripping increased until the test was terminated at sixty (60) minutes.

No change was noticed in the unexposed surface until around ten minutes into the test, at which time the thermocouples on the unexposed face began registering increased temperatures. At about thirty (30) minutes into the test the temperatures on the unexposed surface leveled out to approximately ninety degrees Centigrade (90° C.) and remained there until the end of the test period. The test continued until one thermocouple exceeded thirty percent (30%) above the average failure temperature of one-hundred sixty-one degrees Centigrade (161° C.); however, at that time the average temperature across the unexposed face was only approximately one-hundred seventeen degrees Centigrade (117° C.). Since the average temperature was well below the failure temperature of one-hundred sixty-one degrees Centigrade (161° C.), it was reasoned that the one thermocouple which reached the failure temperature was quite possibly located at a thin spot or other abnormality in the test specimen, and the conclusion was reached that the test specimen successfully attained a fire resistant rating for a period of sixty (60) minutes.

The furnace was turned off, and the specimen was removed from the test apparatus. The test sample was immediately subjected to a hose stream consisting of a seventy-three (73) second spray delivered through a two and one-half (2½) inch hose at thirty pounds (30 lbs.) per square inch delivery pressure. The impact, erosion, and cooling effect of the stream dislodged most of the fiber insulation from the corrugated wall; however, the corrugated steel therebelow showed no visible damage.

TEST V—Sound Absorption

A sound absorption test, conducted under the requirements as set out in the American Society for Testing and Materials Standard Test Method For Sound Absorption and Sound Absorption Coefficients By The Reverberation Room Method, ANSI/ASTM C423-77, was performed on the insulation. A one-inch coat of the present insulation composition was spray-applied to a one-half inch gypsum board backing mounted on a two-inch by two-inch wood frame providing two inch air space. The sample was laid directly on the floor, and the following test results were obtained:

| | ⅓ Octave Band Center Frequency, H₃ | | | | | | |
|---|---|---|---|---|---|---|---|
| | 125 | 250 | 500 | 1000 | 2000 | 4000 | NRC |
| Absorption Coefficients | .45 | .40 | .69 | .85 | .95 | .91 | .70 |

TEST VI—Light Reflectance

The light reflectance of the present insulation material was measured in accordance with the ASTM "Tentative Method of Test for Light Reflectance Of Acoustical Materials By The Integrating Sphere Reflectometer," ASTM designation C523-68, using a General Electric reflectometer. A one-inch thick sample of the present insulation, measuring thirty-six inches by forty-eight inches, was used, and the following test results for the fifteen tested spots were recorded:

| Reflectance Values | | |
|---|---|---|
| 60 | 63 | 64 |
| 66 | 63 | 65 |
| 59 | 62 | 62 |
| 58 | 66 | 64 |
| 62 | 60 | 63 |

The average reflectance was found to be 0.63

It is clear that the insulation composition described herein is a superior insulation for use as a firewall, sound absorption layer, or thermal transmission resistant layer. Although one embodiment and several modifications have been described in detail herein, various changes may be made without departing from the scope of the invention.

I claim:

1. A building insulation comprising thirty-five percent (35%) to fifty-three percent (53%) by weight of cellulose fiber, three percent (3%) to five percent (5%) by weight of an acid-containing fire retardant for reducing the flammability of said cellulose, seven percent (7%) to nine percent (9%) by weight of expanded silicate glass for reducing the corrosive effect of said acid-containing fire retardant, and thirty-five percent (35%) to fifty-three percent (53%) by weight of mineral wool.

2. A building insulation as defined in claim 1 in which said cellulose fiber is a long-fiber cellulose.

3. A building insulation as defined in claim 2 in which said fire retardant is boric acid.

4. A building insulation as defined in claim 1 in which said mineral wood is a high-temperature mineral wool.

5. A building insulation as defined in claim 1 in which said fire retardant is boric acid.

6. A building insulation as defined in claim 4 in which said cellulose fiber is a long-fiber cellulose.

7. An insulation composition as defined in claim 5 in which said cellulose fiber and mineral wool together constitute between about eighty-six percent (86%) and about ninety percent (90%) of the total weight of the composition, expanded silicate glass constitutes about eight percent (8%) by weight of the total composition, and boric acid constitutes about four percent (4%) by weight of the total composition.

8. An insulation composition as defined in claim 7 in which said cellulose fiber is a long-fiber cellulose.

9. An insulation composition as defined in claim 8 in which said cellulose fiber and said mineral wool are present in about equal amounts by weight in the composition.

10. An insulation composition as defined in claim 9 in which said mineral wool is a high-temperature mineral wool.

11. An insulation composition as defined in claim 7 in which said cellulose fiber and said mineral wool are present in about equal amounts by weight in the composition.

12. An insulation composition as defined in claim 7 in which said mineral wool is a high-temperature mineral wool.

13. An insulation composition as defined in claim 11 in which a fireproof adhesive is mixed with said fiber, wool, acid and silicate glass for assisting in retaining the composition on a surface.

14. An insulation composition as defined in claim 7 in which a fireproof adhesive is mixed with said fiber, wool, acid and silicate glass for assisting in adhering the composition to a surface.

* * * * *